US009522621B2

(12) United States Patent
Krajenke et al.

(10) Patent No.: US 9,522,621 B2
(45) Date of Patent: Dec. 20, 2016

(54) TAILGATE ASSEMBLY WITH A STEP ASSIST HANDLE

(71) Applicant: GM GLOBAL TECHNOLOGY OPERATIONS LLC, Detroit, MI (US)

(72) Inventors: Gary W. Krajenke, Warren, MI (US); Mark G. Rogers, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 5 days.

(21) Appl. No.: 14/694,245

(22) Filed: Apr. 23, 2015

(65) Prior Publication Data

US 2016/0311355 A1 Oct. 27, 2016

(51) Int. Cl.
*B60N 3/02* (2006.01)
*B62D 33/027* (2006.01)

(52) U.S. Cl.
CPC ........... *B60N 3/023* (2013.01); *B62D 33/0273* (2013.01)

(58) Field of Classification Search
CPC .......................... B60N 3/023; B62D 33/0273
USPC ........................................ 296/1.02, 62, 57.1
See application file for complete search history.

(56) References Cited

U.S. PATENT DOCUMENTS

| | | | | |
|---|---|---|---|---|
| 7,090,276 B1 * | 8/2006 | Bruford | ............. | B62D 33/0273 296/1.02 |
| 7,530,619 B1 * | 5/2009 | Bruford | ..................... | B60R 3/02 296/1.02 |
| 7,673,922 B1 * | 3/2010 | Grimes | ..................... | B60R 3/02 280/166 |
| 8,201,869 B1 * | 6/2012 | Butlin, Jr. | ................. | B60R 3/02 296/57.1 |
| 8,251,423 B1 * | 8/2012 | Lingle | ..................... | B60R 3/00 296/1.02 |
| 8,444,201 B1 * | 5/2013 | Crawford | .................. | B60R 3/02 296/50 |
| 8,613,475 B1 * | 12/2013 | Statz | ..................... | B60R 3/007 296/1.02 |
| 8,919,853 B2 * | 12/2014 | Krishnan | ............... | B62D 33/03 280/164.1 |
| 8,985,660 B1 * | 3/2015 | Weber | ..................... | B60R 3/005 16/422 |
| 2008/0136208 A1 * | 6/2008 | Kuznarik | ........... | B62D 33/0273 296/62 |
| 2009/0273202 A1 * | 11/2009 | Heaman | ............. | B62D 33/0273 296/26.1 |
| 2010/0181741 A1 * | 7/2010 | Webb | ..................... | B60R 3/02 280/166 |

(Continued)

*Primary Examiner* — Jason S Morrow
(74) *Attorney, Agent, or Firm* — Quinn Law Group, PLLC

(57) ABSTRACT

A tailgate assembly includes a structure, and a handle assembly attached to the structure. The handle assembly is moveable relative to the structure between a stowed position, an intermediate position, and a deployed position. The handle assembly includes a handle portion, and a mounting system attached to the structure and rotatably supporting the handle portion relative to the structure. The mounting system supports the handle portion for rotation about both a first axis and a second axis. The handle portion rotates about the first axis to move between the stowed position and the intermediate position to position the handle portion outside an interior space of the structure. The handle portion rotates about the second axis to move between the intermediate position and the deployed position, whereby a user may grasp the handle portion.

18 Claims, 4 Drawing Sheets

(56) References Cited

U.S. PATENT DOCUMENTS

| | | | | |
|---|---|---|---|---|
| 2012/0104721 A1* | 5/2012 | Genest | ............... | B60R 3/02 |
| | | | | 280/166 |
| 2014/0203587 A1* | 7/2014 | Krishnan | ............... | B62D 33/03 |
| | | | | 296/62 |
| 2015/0336622 A1* | 11/2015 | Worden | ............. | B62D 33/0273 |
| | | | | 280/163 |
| 2016/0075286 A1* | 3/2016 | Butlin, Jr. | ................. | B60R 3/02 |
| | | | | 296/62 |

* cited by examiner

TAILGATE ASSEMBLY WITH A STEP ASSIST HANDLE

TECHNICAL FIELD

The disclosure generally relates to a tailgate assembly for a vehicle, and more specifically, to a tailgate assembly having a step assist handle.

BACKGROUND

Vehicles, such as but not limited to pick-up trucks, may include a tailgate assembly that is moveable to provide access to a cargo area of the vehicle. The tailgate assembly may include a deployable step to facilitate easier ingress and egress into the cargo area of the vehicle. The tailgate assembly may further be equipped with a step assist handle that a user may grasp while stepping into or out of the cargo area of the vehicle to help steady themselves.

SUMMARY

A tailgate assembly for a vehicle is provided. The tailgate assembly includes a structure, and a handle assembly attached to the structure. The handle assembly is moveable relative to the structure between a stowed position, an intermediate position, and a deployed position. The handle assembly includes a handle portion, and a mounting system attached to the structure and rotatably supporting the handle portion relative to the structure. The mounting system supports the handle portion for rotation about both a first axis and a second axis. The handle portion rotates about the first axis to move between the stowed position and the intermediate position. The handle portion rotates about the second axis to move between the intermediate position and the deployed position.

A vehicle is also provided. The vehicle includes a body and a tailgate assembly. The tailgate assembly includes a structure that is moveably attached to the body. The tailgate assembly includes a handle assembly having a fixed base portion fixedly attached to the structure, and a rotating base portion rotatably connected to the fixed base portion. The rotating base portion is rotatable relative to the fixed base portion about a second axis. A handle portion is rotatably connected to the rotating base portion for rotation about a first axis, relative to the rotating base portion. The handle portion rotates about the first axis relative to the rotating base portion to move between a stowed position and an intermediate position. The handle portion and the rotating base portion rotate in unison about the second axis to move between the intermediate position and a deployed position.

Accordingly, the movement of the handle portion, between the stowed position and the intermediate position, and between the intermediate position and the deployed position, allows the handle portion to be stowed in an interior space of the tailgate assembly. When needed, a user may grasp the handle portion and rotate the handle portion about the first axis, from the stowed position into the intermediate position, thereby positioning the handle portion substantially outside the interior space. Once positioned outside the interior space of the tailgate assembly, the handle portion may be rotated about the second axis, from the intermediate position into the deployed position, whereby a user may grasp the handle to assist in ingress or egress into a cargo area of the vehicle, e.g., a bed of a pick-up truck.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Figure 1:
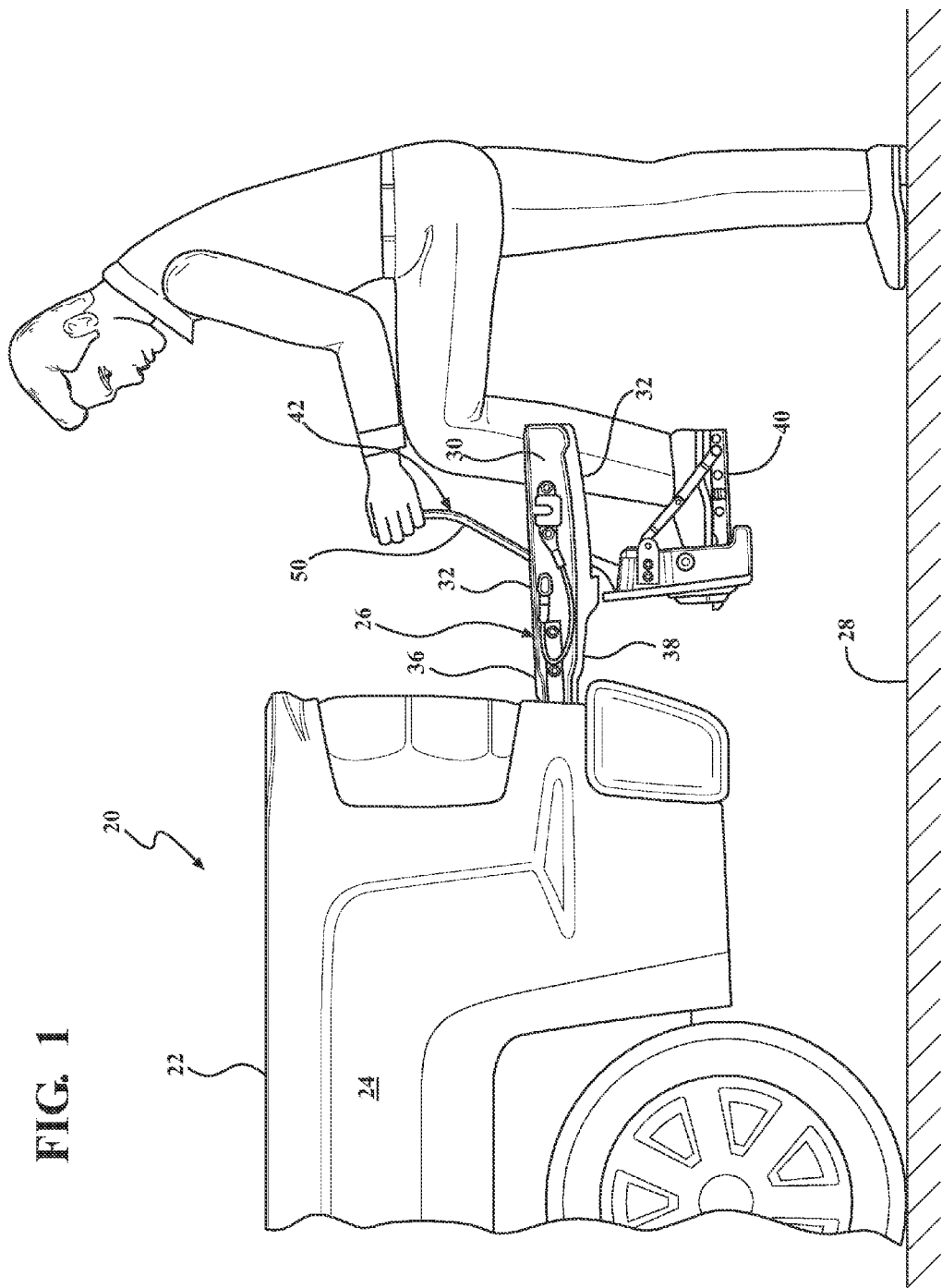
FIG. 1 is a schematic side view of a vehicle showing a tailgate assembly.

Referring to the Figures, wherein like numerals indicate like parts throughout the several views, a vehicle is generally shown at 20. Referring to FIG. 1, the vehicle 20 is shown as a pick-up truck having a body 22 that defines a bed, i.e., a cargo area 24. However, it should be appreciated that the vehicle 20 may be configured in some other style.

The body 22 includes a tailgate assembly 26. As shown, the tailgate assembly 26 is disposed at a rearward end of the body 22, and is moveably attached to the body 22 for movement between a closed position (not shown), and an open position (shown in FIG. 1). When the tailgate assembly 26 is disposed in the closed position, the tailgate assembly 26 closes or blocks access to the cargo area 24. When the tailgate is rotated or lowered into the open position, such as shown in FIG. 1, the tailgate assembly 26 allows access into the cargo area 24 of the body 22. As shown, the tailgate assembly 26 is positioned in an approximately vertical orientation relative to a ground surface 28 when disposed in the closed position, and is positioned in an approximately horizontal orientation relative to the ground surface 28 when disposed in the open position.

Figure 2:
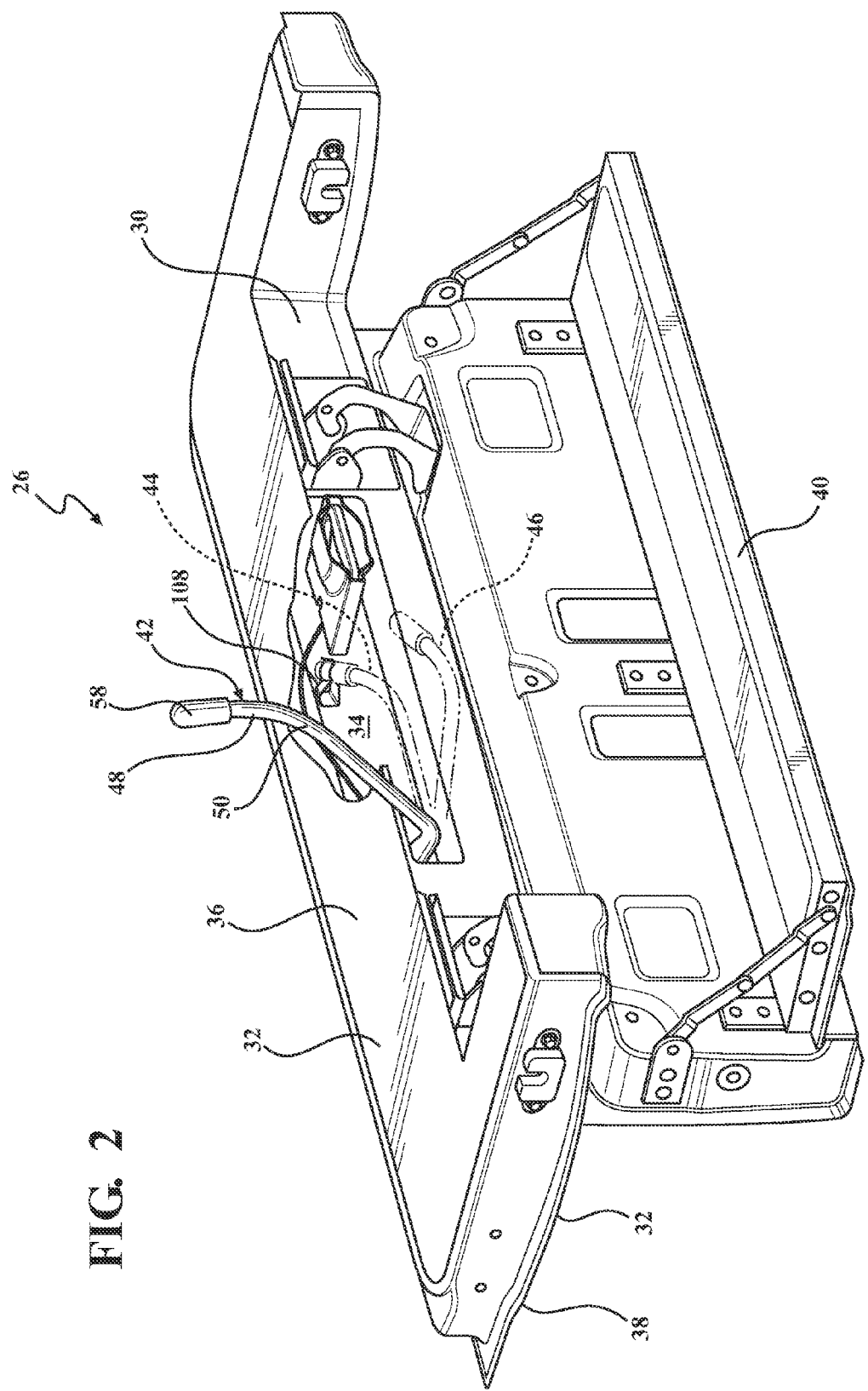
FIG. 2 is a schematic perspective view of the tailgate assembly.

Referring to FIG. 2, the tailgate assembly 26 includes a structure 30, which may be referred to as a frame or rigid support system. The structure 30 is moveably attached to the body 22 for rotating movement between the closed position and the open position. The structure 30 may include one or more panels 32, which may be mounted on the structure 30 to provide an interior surface 36 and/or and exterior surface 38 for the structure 30. The structure 30 is formed to define an interior space 34, e.g., a pocket. The interior space 34 is at least partially covered by the interior surface 36 and/or the exterior surface 38 of the structure 30, such as by one or more of the panels 32 attached to the structure 30.

As shown in FIGS. 1 and 2, the tailgate assembly 26 may further include a deployable step 40. The deployable step 40 is attached to the structure 30, and is moveable between a stored position (not shown) and a lowered position, such as shown in FIGS. 1 and 2. When disposed in the stored position, the deployable step 40 is concealed and not exposed. When the deployable step 40 is disposed in the lowered position, the deployable step 40 presents a step that is disposed at a lower elevation relative to the ground surface 28 than the structure 30 of the tailgate assembly 26, when the tailgate assembly 26 is disposed in the open position, for a user to step on during ingress or egress into or out of the cargo area 24 of the body 22.

Referring to FIG. 2, the tailgate assembly 26 includes a handle assembly 42. The handle assembly 42 is attached to the structure 30, and is moveable between a stowed position 44, an intermediate position 46, and a deployed position 48. The handle assembly 42 is disposed within the interior space 34 of the structure 30 when disposed in the stowed position 44, and is positioned to provide a grab bar or assist handle for a user stepping into or out of the cargo area 24 of the vehicle 20 when disposed in the deployed position 48. The intermediate position 46 is a position between the stowed position 44 and the deployed position 48, into which the handle assembly 42 must be moved to withdraw the handle assembly 42 from the interior space 34 of the structure 30 and move the handle assembly 42 into the deployed position 48. When the handle assembly 42 is positioned in the stowed position 44, and the deployable step 40 is positioned in the stored position, the handle assembly 42 is concealed by the deployable step 40, within the interior space 34 of the structure 30. When the deployable step 40 is positioned in the lowered position, the handle assembly 42 is exposed so that the user may grasp the handle assembly 42 and move the handle assembly 42 between the deployed position 48 and the stowed position 44.

Figure 3:
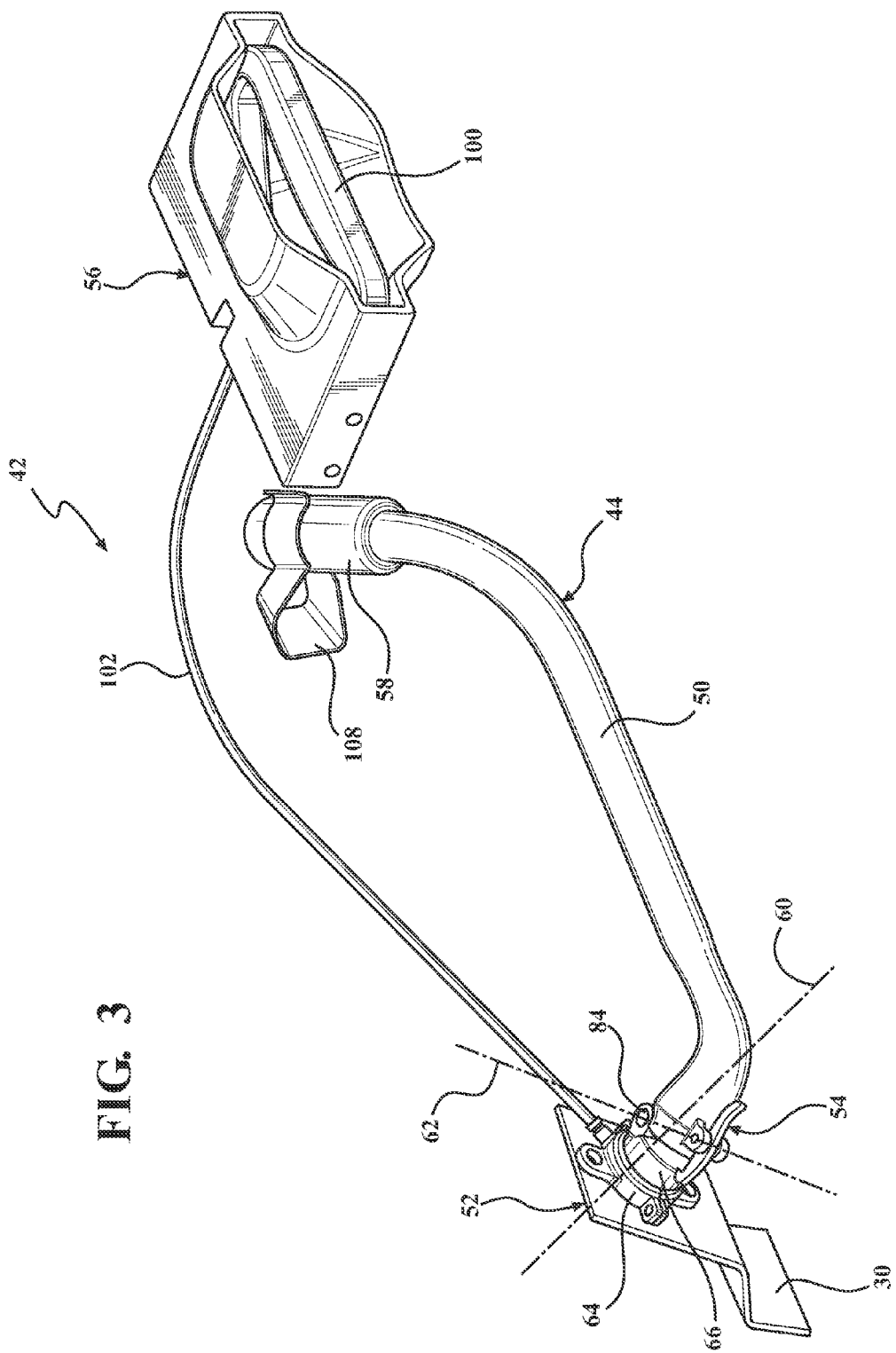
FIG. 3 is a schematic perspective view showing a handle assembly of the tailgate assembly.
Figure 4:
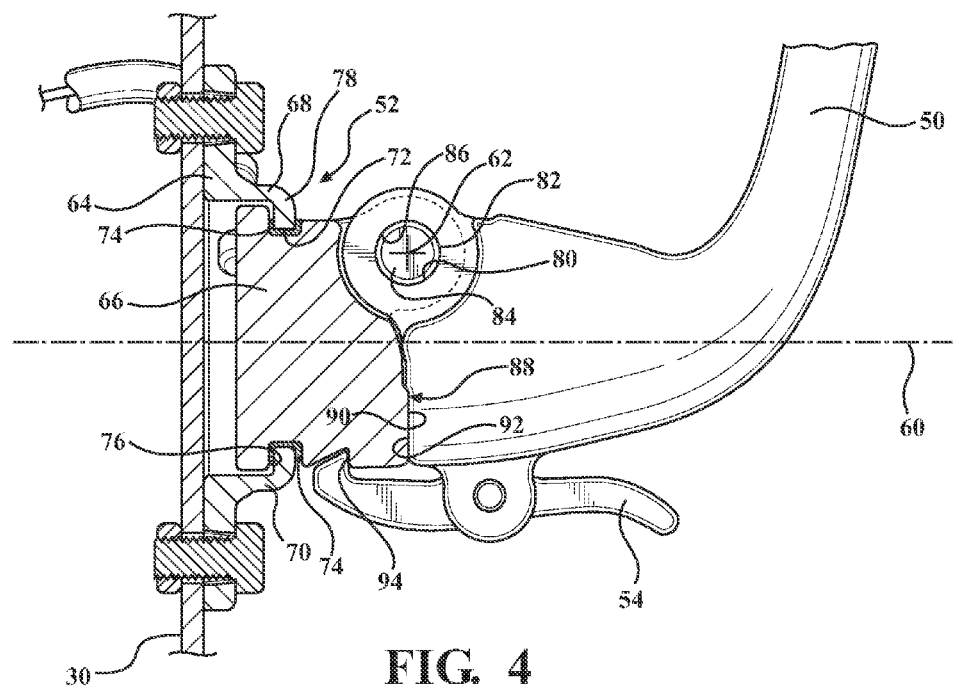
FIG. 4 is a fragmentary, cross sectional view of the handle assembly.
Figure 5:
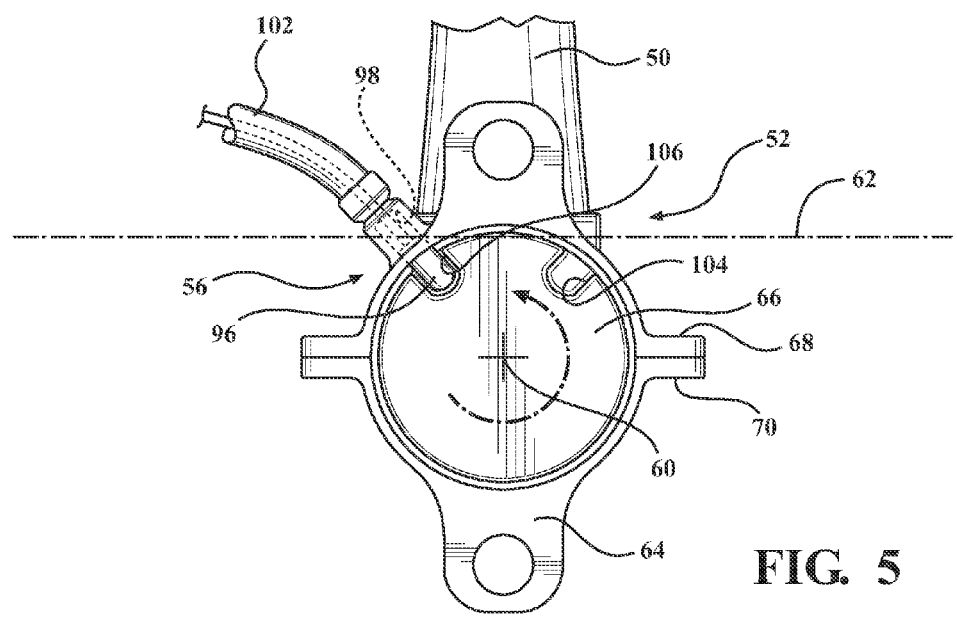
FIG. 5 is a fragmentary, end view of the handle assembly.

Referring to FIG. 3, the handle assembly 42 includes a handle portion 50, a mounting system 52, a latch mechanism 54, and a release mechanism 56. The handle portion 50 is an elongated member that includes the grip 58 which the user may grasp to steady themselves when stepping into or out of the cargo area 24. As shown in FIG. 4, the handle portion 50 is rotatably attached to the structure 30. As shown in FIGS. 3 through 5, the handle portion 50 rotates about both a first axis 60 and a second axis 62. The handle portion 50 rotates about the first axis 60 to move between the stowed position 44 and the intermediate position 46. The handle portion 50 rotates about the second axis 62 to move between the intermediate position 46 and the deployed position 48.

Referring to FIG. 3, the first axis 60 is transverse to the second axis 62. Additionally, the first axis 60 is laterally offset relative to the second axis 62. The second axis 62 extends generally parallel with the structure 30 of the tailgate assembly 26. When the tailgate assembly 26 is disposed in the open position, the second axis 62 is disposed in a generally horizontal orientation relative to the ground surface 28. The first axis 60 is substantially perpendicular to the second axis 62, and is laterally offset from the second axis 62. When the handle assembly 42 is disposed in the stowed or intermediate positions 46, the first axis 60 is disposed in a general vertical orientation relative to the ground surface 28. However, the first axis 60 rotates with the handle portion 50 about the second axis 62 as the handle portion 50 moves from the intermediate position 46 into the deployed position 48. Accordingly, when the handle portion 50 is disposed in the deployed position 48, the first axis 60 is disposed in a generally horizontal orientation relative to the ground surface 28.

Referring to FIGS. 4 and 5, the mounting system 52 interconnects the handle portion 50 and the structure 30. As such, the mounting system 52 is attached to the structure 30, and rotatably supports the handle portion 50 relative to the structure 30 for rotation about both the first axis 60 and the second axis 62. The mounting system 52 includes a fixed base portion 64 and a rotating base portion 66. The fixed base portion 64 is fixedly attached to the structure 30. As shown, the fixed base portion 64 includes an upper half 68 and a lower half 70. Each of the upper half 68 and the lower half 70 of the fixed base portion 64 may be attached to the structure 30 in any suitable manner, such as but not limited to with one or more bolts, screws, clips, fasteners, etc. The upper half 68 and the lower half 70 cooperate to define an annular opening 72. A base bushing 74 is disposed within the annular opening 72, and is supported by both the upper half 68 and the lower half 70 of the fixed base portion 64, within the annular opening 72. The base bushing 74 rotatable supports the rotating base portion 66 relative to the fixed base portion 64, such that the rotating base portion 66 is rotatably connected to the fixed base portion 64 for rotation about the second axis 62. The second axis 62 is defined by a central, longitudinal axis of the rotating base portion 66.

Referring to FIG. 4, the rotating base portion 66 is fixed in an axial position along the second axis 62, relative to the fixed base portion 64, so that the rotating base portion 66 cannot move along the second axis 62 relative to the fixed base portion 64. The rotating base portion 66 may include an annular groove 76, with the fixed base portion 64 including an annular flange 78 extending into the annular groove 76, substantially perpendicular to the second axis 62. The base bushing 74 may be disposed within the annular groove 76, between the annular flange 78 and the rotating base portion 66.

Referring to FIG. 4, the rotating base portion 66 defines a pin bore 80, and includes a pin bushing 82 disposed within the pin bore 80. The pin bushing 82 is supported by the rotating base portion 66. The pin bushing 82 rotatably supports a pivot pin 84 relative to the rotating base portion 66. The pivot pin 84 interconnects the handle portion 50 and the rotating base portion 66. A central longitudinal axis of the pivot pin 84 defines the first axis 60. The handle portion 50 includes attachment bore 86, co-axially located with the pin bore 80, with the pin bushing 82 and the pivot pin 84 extending through both the pin bore 80 of the rotating base portion 66 and the attachment bore 86 of the handle portion 50.

Referring to FIG. 4, the rotating base portion 66 includes a stop 88 that contacts and engages the handle portion 50 when the handle portion 50 is disposed in the deployed position 48. The stop 88 is operable to prevent over rotation beyond the deployed position 48, of the handle portion 50 relative to the rotating base portion 66, when the handle portion 50 rotates from the intermediate position 46 into the deployed position 48. As shown, the stop 88 includes a first surface 90 defined by the rotating base portion 66, which contacts or engages a second surface 92 defined by the handle portion 50, when the handle portion 50 is disposed in the intermediate position 46 and/or the deployed position 48. When the handle portion 50 is disposed in the stowed position 44, the first surface 90 and the second surface 92 are separated from each other and do not contact each other. When the handle portion 50 is rotated about the first axis 60, from the stowed position 44 into the intermediate position 46, the second surface 92 of the handle portion 50 is brought into abutting engagement with the first surface 90 of the rotating base portion 66, thereby preventing further rotation of the handle portion 50 about the first axis 60. The position of the handle portion 50 when disposed in the intermediate position 46, which is defined by the second surface 92 engaging the first surface 90, is the required position necessary for the handle portion 50 to clear the structure 30 and the panels 32 of the tailgate assembly 26 when rotating about the second axis 62 between the intermediate position 46 and the deployed position 48. It should be appreciated that the mounting system 52 may be configured differently than the exemplary embodiment described above and shown in the Figures.

As noted above and as shown in FIG. 4, the handle assembly 42 may further include the latch mechanism 54. The latch mechanism 54 selectively latches the handle portion 50 to the mounting system 52 when the handle portion 50 is disposed in the intermediate position 46 and/or the deployed position 48. As shown, the rotating base portion 66 includes a catch 94, and the latch mechanism 54 is attached to and supported by the handle portion 50. The latch mechanism 54 is operable to engage the catch 94 in latching engagement when the handle portion 50 is disposed in either the intermediate position 46 or the deployed position 48. The latch mechanism 54 may include a spring or other biasing device capable of biasing the latch mechanism 54 into a latching position, so that the latch mechanism 54 automatically engages the catch 94 when the handle portion 50 is rotated into the intermediate position 46. The latch mechanism 54 must be manually released in order for the handle portion 50 to rotate about the first axis 60, from the intermediate position 46 into the stowed position 44. It should be appreciated that the latch mechanism 54 may be configured differently than the exemplary embodiment described herein and shown in the Figures.

Referring to FIGS. 3 and 5, the release mechanism 56 is coupled to the mounting system 52. The release mechanism 56 is operable to latch the rotating base portion 66 relative to the fixed base portion 64 in either a first rotational position or a second rotational position. The release mechanism 56 latches the rotating base portion 66 in the first rotational position when the handle assembly 42 is disposed in the stowed position 44 or the intermediate position 46. The release mechanism 56 latches the rotating base portion 66 in the second rotational position when the handle portion 50 is disposed in the deployed position 48.

Referring to FIG. 5, the release mechanism 56 includes a lock pin 96 that is supported by the fixed base portion 64. The fixed base portion 64 includes an aperture 98, which slideably supports the lock pin 96 for sliding movement along a longitudinal axis of the lock pin 96. Referring to FIG. 3, the release mechanism 56 further includes a lever 100. The lever 100 is attached to the structure 30, and is connected to the lock pin 96 via a cable 102. The cable 102 transmits movement of the lever 100 to the lock pin 96. The lever 100 is operable to move the lock pin 96 between an extended locking position, and a retracted release position.

Referring to FIG. 5, the rotating base portion 66 includes a first notch 104 and a second notch 106. The first notch 104 and the second notch 106 are angularly positioned relative to each other about the second axis 62. The lock pin 96 is operable to engage the first notch 104 in interlocking engagement when the rotating base portion 66 is disposed in the first rotational position. The lock pin 96 is operable to engage the second notch 106 in interlocking engagement when the rotating base portion 66 is disposed in the second rotational position. The lever 100 and/or the lock pin 96 may include a biasing device, such as a spring, to bias the lock pin 96 into the extended locking position, so that the lock pin 96 automatically engages and extends into one of the first notch 104 or the second notch 106 as soon as the lock pin 96 and either the first notch 104 or the second notch 106 are aligned. It should be appreciated that the release mechanism 56 may be configured differently than the exemplary embodiment described herein and shown in the Figures.

As shown in FIG. 3, the tailgate assembly 26 may further include a stowage clip 108. The stowage clip 108 is attached to the structure 30, and is operable to secure the handle portion 50 in the stowed position 44 relative to the structure 30. As shown, the stowage clip 108 is located within the interior space 34 of the structure 30, and includes a generally C-shaped clip that snaps over a tubular portion of the handle portion 50. However, it should be appreciated that the stowage clip 108 may be configured in some other manner not shown or described herein.

In order to deploy the handle assembly 42, the tailgate assembly 26 must first be rotated into the open position, and the deployable step 40 must be lowered into the lowered position, such as shown in FIG. 1. Moving the deployable step 40 into the lowered position exposes the handle assembly 42, which is concealed within the interior space 34 of the structure 30 in the stowed position 44. When the handle assembly 42 is positioned in the stowed position 44, a user may grasp the handle portion 50 and rotate the handle portion 50 about the first axis 60, thereby disengaging the handle portion 50 from the stowage clip 108, and moving the handle portion 50 into the intermediate position 46. When the tailgate assembly 26 is in the open position, and the handle assembly 42 is in the stowed position 44 and/or the intermediate position 46, the first axis 60 extends generally vertically relative to the ground surface 28. As such, rotating the handle portion 50 about the first axis 60 moves the grip 58 of the handle portion 50 rearward of the structure 30, and out of the interior space 34.

Once the handle portion 50 has been rotated into the intermediate position 46, the handle portion 50 engages the stop 88 on the mounting system 52, and the latch mechanism 54 engages to secure the handle portion 50 to the mounting system 52 and prevent rotation of the handle portion 50 about the first axis 60. Once the handle portion 50 is positioned in the intermediate position 46, the user actuates the release mechanism 56 to disengage the lock pin 96 from the first notch 104 of the fixed base portion 64. Once the lock pin 96 is disengaged from the first notch 104, the handle portion 50 and the rotating base portion 66 may be rotated simultaneously about the second axis 62. As soon as the first notch 104 of the rotating base portion 66 have moved past the lock pin 96, the user may release the lever 100, thereby allowing the lock pin 96 to bias toward the extended locking position. In so doing, as soon as the handle portion 50 and the rotating base portion 66 rotate into the deployed position 48, the second notch 106 aligns with the lock pin 96, and the lock pin 96 may automatically extend into the extending locking position to engage the second notch 106 in interlocking engagement, thereby securing the handle portion 50 relative to the tailgate assembly 26 in the deployed position 48. In order to move the handle assembly 42 into the stowed position 44, the process is simply reversed.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:
1. A tailgate assembly for a vehicle, the tailgate assembly comprising:
   a structure;

a handle assembly attached to the structure and moveable between a stowed position, an intermediate position, and a deployed position, wherein the handle assembly includes:
    a handle portion; and
    a mounting system attached to the structure and rotatably supporting the handle portion relative to the structure for rotation about both a first axis and a second axis;
    wherein the handle portion rotates about the first axis to move between the stowed position and the intermediate position;
    wherein the handle portion rotates about the second axis to move between the intermediate position and the deployed position;
    wherein the mounting system includes a fixed base portion fixedly attached to the structure, and a rotating base portion rotatably connected to the fixed base portion for rotation about the second axis; and
    wherein the mounting system includes a pivot pin interconnecting the handle portion and the rotating base portion, wherein a central longitudinal axis of the pivot pin defines the first axis.

2. The tailgate assembly set forth in claim 1 wherein the rotating base portion includes a stop contacting the handle portion when the handle portion is disposed in the deployed position, wherein the stop is operable to prevent over rotation beyond the deployed position, of the handle portion relative to the rotating base portion, when the handle portion rotates from the intermediate position into the deployed position.

3. The tailgate assembly set forth in claim 1 wherein the handle assembly includes a latch mechanism selectively latching the handle portion to the mounting system when the handle portion is disposed in the deployed position.

4. The tailgate assembly set forth in claim 3 wherein the rotating base portion includes a catch, with the latch mechanism attached to and supported by the handle portion, and operable to engage the catch in latching engagement when the handle portion is disposed in the deployed position.

5. The tailgate assembly set forth in claim 1 wherein the handle assembly includes a release mechanism coupled to the mounting system and operable to latch the rotating base portion relative to the fixed base portion in a first rotational position when the handle assembly is disposed in the stowed position or the intermediate position, and a second rotational position when the handle portion is disposed in the deployed position.

6. The tailgate assembly set forth in claim 5 wherein the release mechanism includes a lock pin supported by the fixed base portion, and a lever attached to the lock pin and operable to move the lock pin between an extended locking position, and a retracted release position.

7. The tailgate assembly set forth in claim 6 wherein the fixed base portion includes an aperture slideably supporting the lock pin.

8. The tailgate assembly set forth in claim 6 wherein the rotating base portion includes a first notch and a second notch, with the first notch and the second notch angularly positioned relative to each other about the second axis, wherein the lock pin is operable to engage the first notch in interlocking engagement when the rotating base portion is disposed in the first rotational position, and wherein the lock pin is operable to engage the second notch in interlocking engagement when the rotating base portion is disposed in the second rotational position.

9. The tailgate assembly set forth in claim 6 wherein the lever is attached to the structure, and wherein a cable connects the lever and the lock pin to transmit movement from the lever to the lock pin.

10. The tailgate assembly set forth in claim 6 wherein the lock pin is biased into the extended locking position.

11. The tailgate assembly set forth in claim 1 further comprising a stowage clip attached to the structure and operable to secure the handle portion in the stowed position relative to the structure.

12. The tailgate assembly set forth in claim 1 wherein the first axis is transverse to the second axis, and wherein the first axis is laterally offset relative to the second axis.

13. The tailgate assembly set forth in claim 1 wherein the structure defines an interior space, with the handle assembly disposed within the interior space when in the stowed position, and wherein the tailgate assembly further comprises a deployable step attached to the structure and moveable between a stored position concealing the handle assembly within the interior space of the structure, and a lowered position presenting a step and exposing the handle assembly.

14. A vehicle comprising:
    a body;
    a tailgate assembly having a structure moveably attached to the body, wherein the tailgate assembly includes a handle assembly including:
        a fixed base portion fixedly attached to the structure;
        a rotating base portion rotatably connected to the fixed base portion for rotation about a second axis relative to the fixed base portion; and
        a handle portion rotatably connected to the rotating base portion for rotation about a first axis relative to the rotating base portion;
        wherein the handle portion rotates about the first axis relative to the rotating base portion to move between a stowed position and an intermediate position; and
        wherein the handle portion and the rotating base portion rotate in unison about the second axis to move between the intermediate position and a deployed position.

15. The vehicle set forth in claim 14 wherein the rotating base portion includes a stop contacting the handle portion when the handle portion is disposed in the deployed position, wherein the stop is operable to prevent over rotation beyond the deployed position, of the handle portion relative to the rotating base portion, when the handle portion rotates from the intermediate position into the deployed position.

16. The vehicle set forth in claim 14 wherein the handle assembly includes a latch mechanism attached to and supported by the handle portion, and a catch defined by the rotating base portion, wherein the latch mechanism is operable to engage the catch in latching engagement when the handle portion is disposed in the deployed position.

17. The vehicle set forth in claim 14 wherein the handle assembly includes a release mechanism having a lock pin supported by the fixed base portion, and a lever attached to the lock pin and operable to move the lock pin between an extended locking position, and a retracted release position, wherein the release mechanism is operable to latch the rotating base portion relative to the fixed base portion in a first rotational position when the handle assembly is disposed in the stowed position or the intermediate position, and a second rotational position when the handle portion is disposed in the deployed position.

18. The vehicle set forth in claim 17 wherein the rotating base portion includes a first notch and a second notch, with the first notch and the second notch angularly positioned relative to each other about the second axis, wherein the lock pin is operable to engage the first notch in interlocking engagement when the rotating base portion is disposed in the first rotational position, and wherein the lock pin is operable to engage the second notch in interlocking engagement when the rotating base portion is disposed in the second rotational position.

\* \* \* \* \*